Patented Dec. 7, 1948

2,455,677

UNITED STATES PATENT OFFICE

2,455,677

PREPARATION OF VINYL ACETYLENES

Joseph T. Horeczy, Cedar Bayou, Tex., assignor, by mesne assignments, to Standard Oil Development Company, Elizabeth, N. J., a corporation of Delaware No Drawing. Application November 13, 1947, Serial No. 785,793

3 Claims. (Cl. 260—678)

The present invention is directed to a method for preparing vinyl acetylenes. More particularly, the invention is directed to a method for reacting a diolefin to produce a substituted acetylenic compound.

Vinyl acetylene is much in demand at the present time as a starting point in the synthesis of special rubber, such as neoprene, which is produced by reacting vinyl acetylene with hydrogen chloride to produce chloroprene. The vinyl acetylenes, by virtue of having a functional vinyl grouping may be reacted with other reactive materials to form resins and may also be used as a starting point for many organic syntheses. However, the most important usage for vinyl acetylene is in the preparation of the special synthetic rubber mentioned above.

Vinyl acetylene is now produced by polymerization of acetylene under special conditions of temperature, pressure, and catalyst which may require very close control of the reaction. The source of acetylene itself may make the conventional method of securing vinyl acetylene expensive since it does not occur naturally and it must be produced by conversion of some hydrocarbon or through the carbide.

In accordance with the present invention, vinyl acetylenes are produced by starting with a conjugated diolefin rather than with an acetylene itself as is the conventional procedure. It has been found that a conjugated diolefin may be halogenated and then may be dehalogenated under selected conditions to form nearly quantitative yields of vinyl acetylene. For example, it has been discovered that tetrabromobutane may be debrominated and dehydrobrominated under selected conditions of temperature to produce nearly quantitative yields of vinyl acetylene. It has been known in the past to treat 1,2,3,4-tetrabromobutane with alcoholic KOH at a temperature of 165° to 170° C. to form diacetylene. The prior art workers found the reaction proceeded in accordance with the following equation under these temperature conditions:

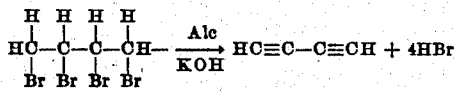

It will be noted from the foregoing equation that four molecules of hydrogen bromide are split out leaving the diacetylene as the end product. This material has no great value and its formation according to the foregoing reaction appears to be of academic interest only.

It has now been discovered that, by carrying out the reaction of the tetrabromobutane at a lower temperature than reported by the previous workers, nearly quantitative yields of vinyl acetylene are formed according to the following equation:

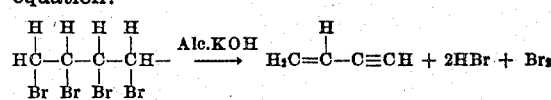

In this particular reaction, illustrated by the equation given above, only two molecules of hydrogen bromide are split off and two bromine atoms are released to form a molecule of bromine. This is a new and distinct reaction by the organic bromides and alcoholic KOH and presents a considerable advance over the reaction shown by previous workers.

The invention will be illustrated further by the following example:

Potassium hydroxide is added to boiling ethyl alcohol until the boiling point of the alcoholic potassium hydroxide is raised to about 120° C. To one liter of this solution in a suitable reactor equipped with a stirrer and a refluxing means are added 200 parts of 1,2,3,4-tetrabromobutane over a period of about one hour while vigorously agitating the reactants. Under these conditions, the tetrabromide is converted to substantially pure vinyl acetylene.

A typical analysis of evolved gases from a reaction as described above is given in the following table:

Table I

| | |
|---|---|
| Propadiene | 0.4 |
| Methyl acetylene | 1.9 |
| Vinyl acetylene | 94.3 |
| Diacetylene | 3.4 |

According to prior art workers, diacetylene is found when reactions of the foregoing type are allowed to proceed at 160° C. It is surprising indeed to find instead of the diacetylene, vinyl acetylene in substantially pure form.

While the foregoing example has been described with reference to treatment of the 1,2,3,4-tetrabromobutane, it will be apparent to the skilled worker that butadiene may be halogenated under controlled conditions to form the tetrahalide then treated under selected temperature and pressure conditions to obtain the vinyl acetylene.

The particular value of the present invention lies in the fact that the recent developments in diolefin chemistry have resulted in large quantities of the diolefins such as butadiene and isoprene being made available in commercial quantities for the first time. Now that the synthetic rubber industry may be competitive with natural rubber, the utilization of the enormous quantities of the diolefins available presents a particular problem to producers of these materials. By converting butadiene, for example, to other chemicals having functional groupings, such as a vinyl grouping, it is possible to start an entirely new line of chemical derivatives.

While the present invention has been described and illustrated by specific reference to vinyl acetylene, it is applicable to the production of other homologs of acetylene having the vinyl grouping. For example, methyl vinyl acetylene may be produced from isoprene or ethyl vinyl acetylene from 2-ethyl-1,3-butadiene under substantially the same conditions described herein.

Other substituted conjugated diolefins may also be used in preparing the tetrabromide for subsequent conversion into the corresponding substituted vinyl acetylene. However, compounds having a substituted vinyl acetylene structure cannot be secured from all tetrahalide diolefin derivatives. As previously indicated, when vinyl acetylene is secured from tetrabromobutane according to my invention, two molecules of hydrogen bromide will be generated as well as one molecule of bromine. Consequenty, in preparing a substituted vinyl acetylene it is necessary that the tetrahalide employed have the general formula:

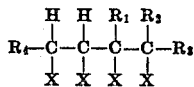

wherein C represents a carbon atom, H represents a hydrogen atom, R1, R2, R3, and R4 represent a hydrogen atom, an alkyl group, or an aryl group and X represents a halogen atom. A compound having the above described configuration, in the dehalogenation reaction, will release two molecules of hydrogen bromine as well as one molecule of bromine thereby resulting in the formation of a substituted vinyl acetylene having the general formula:

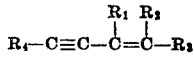

wherein C represents a carbon atom and R1, R2, R3, and R4 represent a hydrogen atom, an alkyl group, or an aryl group.

The temperature and pressure conditions found most suitable will range in the neighborhood from about 100° to about 130° C. and in no case should exceed about 135° C. Otherwise, if the temperature is allowed to proceed to above 135° C., the diacetylenic compounds may be produced rather than the vinyl acetylene. The temperature conditions to be employed for the other members of the vinyl acetylene series will lie within the preferred range given above.

This application is a continuation-in-part of Serial Number 726,231, filed February 3, 1947, now abandoned.

The nature and objects of the present invention having been fully described and illustrated, what I wish to claim as new and useful and to secure by Letters Patent is:

1. A method for producing vinyl acetylene which includes the steps of reacting 1,2,3,4-tetrabromobutane with an alcoholic solution of potassium hydroxide at a temperature of 120° C. and recovering substantially pure vinyl acetylene.

2. A method for producing a vinyl acetylene which comprises reacting a compound having the formula

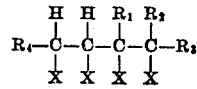

wherein C represents a carbon atom, H represents a hydrogen atom, and wherein R1, R2, R3, and R4 each represent a substituent selected from the group consisting of a hydrogen atom, an alkyl group, and an aryl group and X represents a halogen atom in an alcoholic alkali hydroxide solution at a temperature in the range of 100° to 135° C. to form a compound having the formula

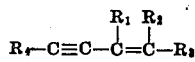

wherein C represents a carbon atom and wherein R1, R2, R3, and R4 each represent a substituent selected from the group consisting of a hydrogen atom, an alkyl group, and an aryl group.

3. A method in accordance with claim 2 in which the compound having the formula

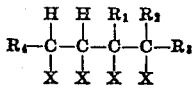

is 1,2,3,4-tetrabromobutane.

JOSEPH T. HORECZY.

REFERENCES CITED

The following references are of record in the file of this patent:

Lespieau et al., Compte Rendus, vol. 180, 675–8 (1925).